United States Patent [19]
Gest

[11] Patent Number: 5,562,304
[45] Date of Patent: Oct. 8, 1996

[54] AIR BAG INFLATOR HAVING A CORRUGATED FILTER WALL

[75] Inventor: William E. Gest, Troy, Mich.

[73] Assignee: TRW Vehicle Safety Systems Inc., Lyndhurst, Ohio

[21] Appl. No.: 499,432

[22] Filed: Jul. 7, 1995

[51] Int. Cl.⁶ .................................................. B60R 21/26
[52] U.S. Cl. ............................ 280/740; 280/741; 55/440
[58] Field of Search ........................... 280/741, 740, 280/742, 736; 55/440, 445, 446; 102/530, 531; 422/164, 165, 166

[56] References Cited

U.S. PATENT DOCUMENTS

| | | | |
|---|---|---|---|
| 3,476,403 | 11/1969 | Richardson | 280/740 |
| 4,158,696 | 6/1979 | Wilhelm | 422/166 |
| 4,817,828 | 4/1989 | Goetz | 222/3 |
| 5,003,887 | 4/1991 | Unterforsthuber et al. | 280/742 |
| 5,028,070 | 7/1991 | Bender | 280/741 |
| 5,100,171 | 3/1992 | Faigle et al. | 280/736 |
| 5,318,323 | 6/1994 | Pietz | 280/736 |

*Primary Examiner*—Eric D. Culbreth
*Assistant Examiner*—Peter C. English
*Attorney, Agent, or Firm*—Tarolli, Sundheim, Covell, Tummino & Szabo

[57] ABSTRACT

An air bag inflator (10) includes a source (50) of inflation fluid, a tubular wall (90) with rows (132) of fluid flow openings (130), and an initiator (36) for initiating a flow of inflation fluid from the source (50) upon the occurrence of a vehicle collision. The tubular wall (90) further has a central axis (104) and a plurality of elongated corrugations (106). The corrugations (106) have radially extending side portions (110). The rows (132) of openings (130) extend along the side portions (110) of the corrugations (106).

25 Claims, 5 Drawing Sheets

AIR BAG INFLATOR HAVING A CORRUGATED FILTER WALL

FIELD OF THE INVENTION

The present invention relates to an inflator for inflating a vehicle occupant restraint such as an air bag.

BACKGROUND OF THE INVENTION

An inflator for inflating a vehicle occupant restraint, such as an air bag, may contain a body of ignitable gas generating material. The gas generating material is ignited when the vehicle experiences a collision for which inflation of the air bag is desired to protect an occupant of the vehicle. As the gas generating material burns, it generates a large volume of gas which is directed to flow from the inflator into the air bag to inflate the air bag. When the air bag is inflated, it extends into the vehicle occupant compartment to restrain an occupant of the vehicle from forcefully striking parts of the vehicle.

Such an inflator commonly has an elongated cylindrical housing. The housing includes an inner tubular wall and an outer tubular wall. A cylindrical filter is contained in the housing concentrically between the tubular walls. The inner tubular wall defines a cylindrical combustion chamber in which the body of gas generating material is contained. A plurality of gas flow openings extend through the inner tubular wall and direct the gas to flow radially outward from the combustion chamber and through the filter toward the outer tubular wall. A plurality of gas flow openings extending through the outer tubular wall similarly direct the gas to flow radially outward from the housing toward the air bag.

SUMMARY OF THE INVENTION

In accordance with the present invention, an apparatus for inflating an inflatable vehicle occupant restraint, such as an air bag, comprises a source of inflation fluid and a tubular wall. The tubular wall has oppositely facing inner and outer surfaces extending around a central axis, and has an array of fluid flow openings. The openings extend through the tubular wall between the inner and outer surfaces. Each of those surfaces has a total surface area which is substantially greater than the total flow area of the array of openings. The apparatus further comprises means for initiating a flow of inflation fluid from the source upon the occurrence of a vehicle collision. The flow of inflation fluid follows a flow path extending through the openings in the tubular wall.

The tubular wall further has a plurality of elongated corrugations. Each corrugation has a pair of radially extending side portions. The array of openings in the tubular wall defines rows of openings extending along the side portions of the corrugations.

In a preferred embodiment of the present invention, the source of inflation fluid comprises an ignitable gas generating material which, when ignited, generates gas for inflating the inflatable vehicle occupant restraint. The tubular wall comprises means for defining a combustion chamber containing the gas generating material. Specifically, a cylindrical portion of the tubular wall defines a central portion of the combustion chamber which extends along the axis of the tubular wall. The gas generating material is contained in the central portion of the combustion chamber. The corrugations in the tubular wall define elongated plenum portions of the combustion chamber which are located inside the corrugations. The plenum portions of the combustion chamber thus extend radially outward from the central portion. Additionally, a plurality of elongated gas flow channels are defined between adjacent corrugations at the outside of the tubular wall.

As a result of the corrugated configuration of the tubular wall, the gas that is generated in the central portion of the combustion chamber is directed to flow radially outward into the plenum portions defined by the corrugations. The gas is directed to turn at right angles before exiting the plenum portions through the openings at the sides of the corrugations. The gas then flows across the channels between the corrugations, and is subsequentially directed radially outward upon flowing against the outer side surfaces of the corrugations which face each other across the channels. The gas is thus directed along a tortuous flow path which causes particulate combustion products to be filtered from the gas when the flow of gas changes directions. The tortuous flow path also causes the gas to become cooled as it moves against the inner and outer surfaces of the tubular wall at the corrugations. In accordance with this feature of the present invention, the inner and outer surfaces of the tubular wall have total surface areas which are substantially greater than the total fluid flow area provided by the array of openings in the tubular wall. Preferably, the openings in the tubular wall together have a total fluid flow area within the range of approximately 5% to approximately 35% of the total surface area of either of the oppositely facing surfaces of the tubular wall.

BRIEF DESCRIPTION OF THE DRAWINGS

Further features of the present invention will become apparent to those skilled in the art to which the present invention relates from reading the following description with reference to the accompanying drawings, in which.

DESCRIPTION OF PREFERRED EMBODIMENTS

Figures 1, 8:
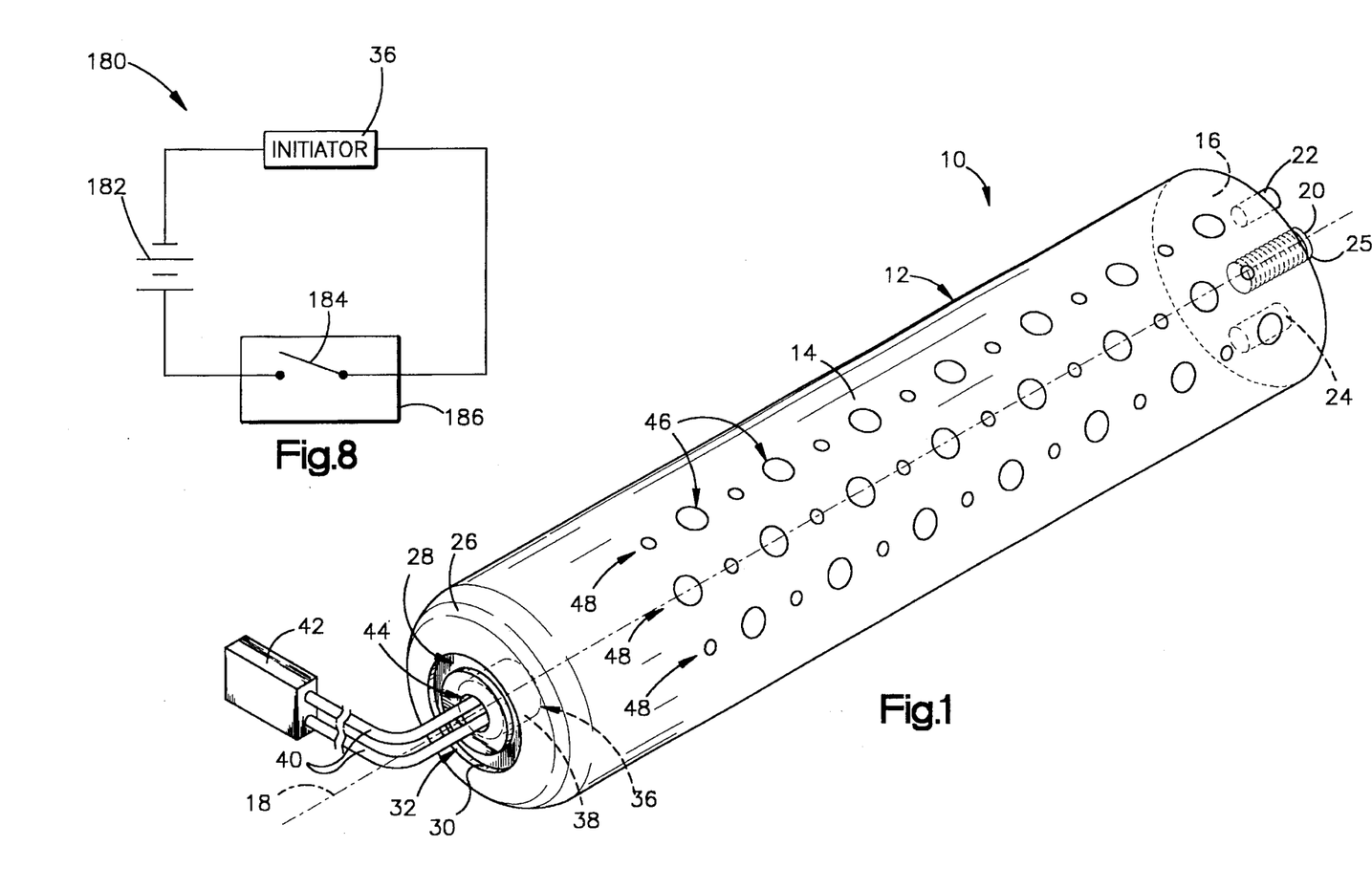
FIG. 1 is a perspective view of an inflator comprising a preferred embodiment of the present invention.
FIG. 8 is a schematic view of an electrical circuit including a part of the inflator of FIG. 1.

An inflator 10 comprising a first embodiment of the present invention is shown in FIG. 1. The inflator 10 has a cylindrical housing 12 which contains a source of inflation fluid for inflating an inflatable vehicle occupant restraint (not shown) such as an air bag. The source of inflation fluid preferably comprises an ignitable gas generating material. When the inflator 10 is actuated, the gas generating material is ignited. The gas generating material then generates a large volume of gas for inflating the restraint.

The housing 12 has an elongated tubular body wall 14 and a circular end wall 16, each of which is centered on a longitudinal central axis 18. The end wall 16 closes one end of the housing 12, and supports a plurality of mounting studs 20, 22, and 24 for mounting the inflator 10 in a reaction canister (not shown). The reaction canister is a known part which contains and supports the inflator 10 in a vehicle. The first mounting stud 20 is centered on the axis 18, and has a screw thread 25 for receiving a threaded fastener. The second and third mounting studs 22 and 24 are unthreaded, and are sized differently from each other so as to be receivable in respective alignment openings in the reaction canister. This ensures that the inflator 10 will be installed in the reaction canister in a predetermined orientation.

The opposite end of the housing 12 is closed in part by an end portion 26 of the tubular wall 14, and in part by an end cap 28 which is received coaxially within the tubular wall 14. The end portion 26 of the tubular wall 14 has a dome-shaped contour, and extends closely over a dome-shaped portion of the end cap 28. The end portion 26 of the tubular wall 14 further has an annular edge surface 30 which defines a circular opening 32 centered on the axis 18. An annular elastomeric seal 34 (FIG. 2) is compressively engaged between the end cap 28 and the end portion 26 of the tubular wall 14. The housing 12 is thus closed and sealed in accordance with the invention set forth in copending U.S. patent application Ser. No. 08/327,281, filed Oct. 21, 1994, entitled AIR BAG INFLATOR AND METHOD OF ASSEMBLY, and assigned to TRW Vehicle Safety Systems Inc.

The inflator 10 further includes an electrically actuatable initiator 36. As shown by way of example in FIG. 1, the initiator 36 is a known part which comprises a cylindrical casing 38 and a pair of electrical lead wires 40. The lead wires 40 extend from the casing 38 to an electrical connector 42. A pyrotechnic material is contained in the casing 38, and is ignited upon the passage of electric current through the initiator 36 between the lead wires 40. When the pyrotechnic material is ignited, it produces combustion products which rupture the casing 38 and emerge rapidly from the casing 38.

The initiator 36 is supported by the end cap 28. The casing 38 is located coaxially within the tubular wall 14, with the lead wires 40 extending outward from the casing 38 through a central opening 44 in the end cap 28 and further through the opening 32 in the tubular wall 14. When the pyrotechnic material is ignited upon actuation of the initiator 36, the casing 38 directs the combustion products into contact with the gas generating material in the housing 12 so as to ignite the gas generating material.

When the gas generating material in the housing 12 is ignited, it rapidly generates a large volume of gas which emerges from the housing 12 through a plurality of outlet openings 46 in the tubular wall 14. The gas is then directed from the inflator 10 to the inflatable vehicle occupant restraint by the reaction canister and/or by a diffuser or manifold structure (not shown), as known in the art.

The outlet openings 46 are closely spaced from each other in parallel rows 48 which extend axially along nearly the entire length of the tubular wall 14. The rows 48 of outlet openings 46 are, in turn, closely spaced from each other in an array extending partially around the circumference of the tubular wall 14. The tubular wall 14 has a similar array of additional outlet openings (not shown) at a location diametrically opposite to the location of the array of openings 46. However, unlike the openings 46, the additional openings are not intended to direct gas toward the air bag, but instead are intended to vent gas away from the air bag if the pressure of the gas exceeds a predetermined elevated level. Such additional openings are known in the art, and preferably have a substantially lesser total flow area in comparison with the total flow area of the openings 46.

Figure 2:
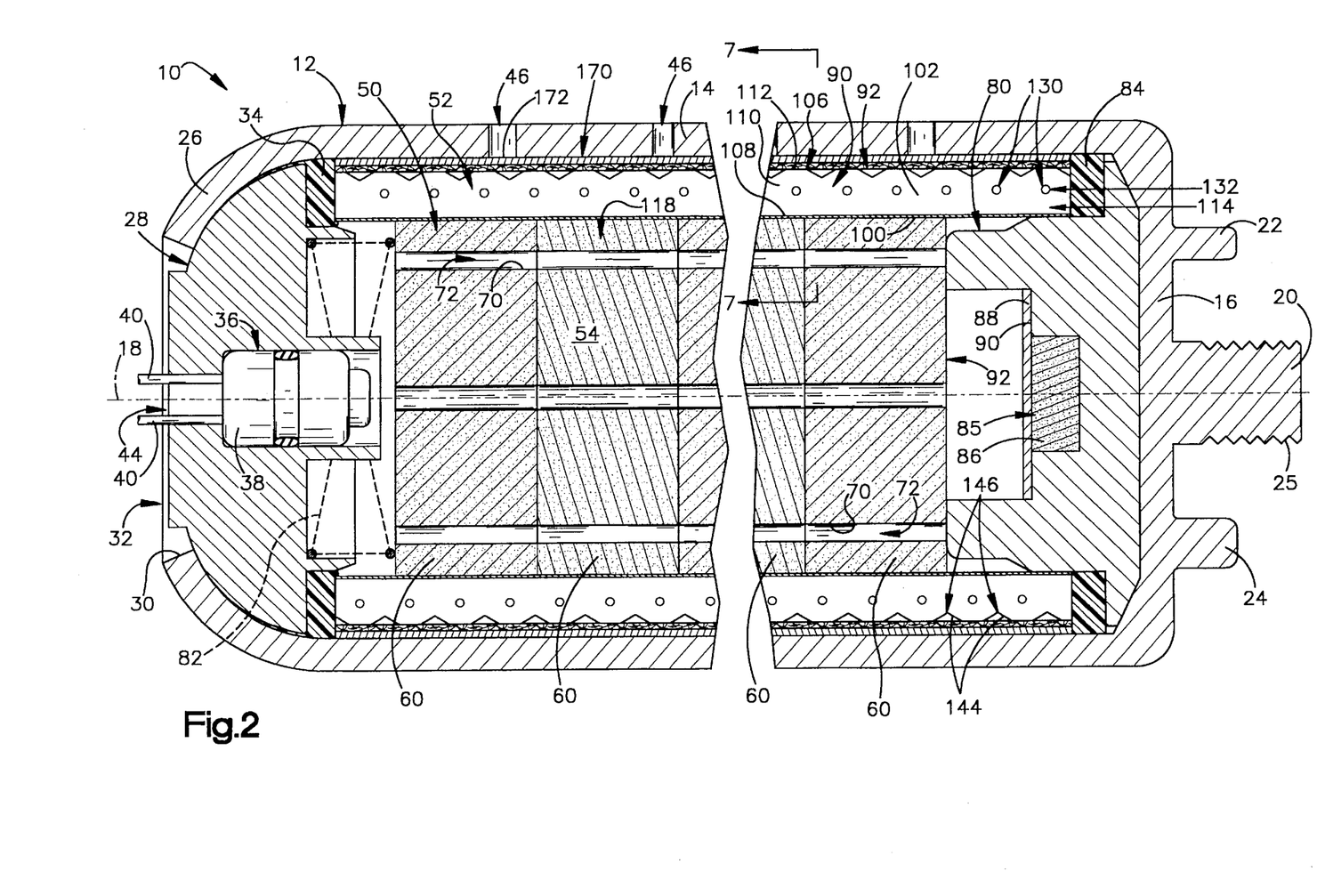
FIG. 2 is a sectional view of the inflator of FIG. 1.

As shown in FIG. 2, the gas generating material in the housing 12 takes the shape of an elongated cylindrical body 50. The housing 12 also contains an elongated tubular filter assembly 52. The filter assembly 52 defines a cylindrical combustion chamber 54 in which the elongated cylindrical body 50 of gas generating material is contained.

The elongated cylindrical body 50 of gas generating material is defined by a plurality of separate, shorter cylindrical bodies 60 of gas generating material which are known as grains. The gas generating material of which the grains 60 are formed is an ignitable material which rapidly generates a large volume of gas when ignited, as described briefly above. The gas generating material may have any suitable composition known in the art, and the grains 60 may have any suitable configuration known in the art.

Figure 3:
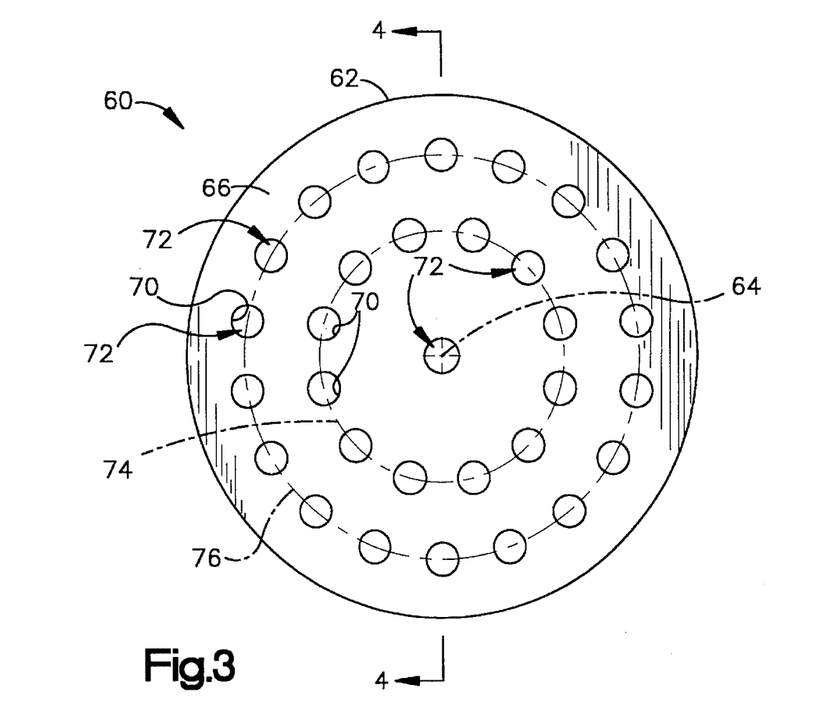
FIG. 3 is an enlarged view of a part shown in FIG. 2.
Figure 4:
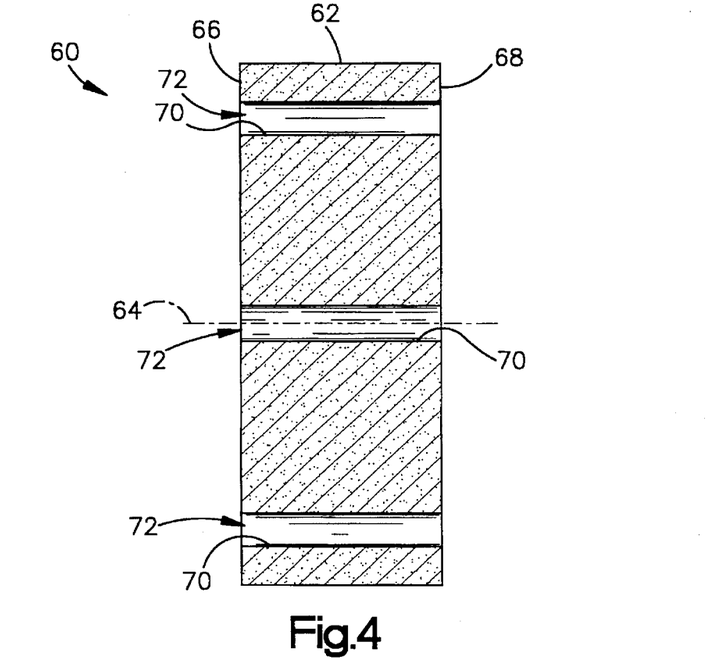
FIG. 4 is a view taken on line 4—4 of FIG. 3.

As an example of the different grains of gas generating material that may be used in the inflator 10, the configuration of one such grain 60 is shown in detail in FIGS. 3 and 4. The grain 60 has a cylindrical outer surface 62 centered on an axis 64. The grain 60 further has first and second planar opposite side surfaces 66 and 68. Each of the side surfaces 66 and 68 has a circular shape centered on the axis 64, and is generally perpendicular to the axis 64.

The grain 60 preferably has a plurality of cylindrical inner surfaces 70, each of which defines a respective cylindrical passage 72 extending axially through the grain 60. The number and arrangement of the cylindrical inner surfaces 70 may vary. As shown by way of example in FIGS. 3 and 4, one of the cylindrical inner surfaces 70 is centered on the axis 64, and the other cylindrical inner surfaces 70 are arranged in first and second circular arrays. The first circular array of the cylindrical inner surfaces 70 extends circumferentially around the axis 64 on a first circular line 74. The first circular line 74 is centered on the axis 64. The second circular array of the cylindrical inner surfaces 70 extends circumferentially around the axis 64 on a second circular line 76. The second circular line 76 also is centered on the axis 64, and is spaced radially outward from the first circular line 74. Moreover, each of the cylindrical inner surfaces 70 in the second circular array is at least partially offset circumferentially from each of the cylindrical inner surfaces 70 in the first circular array.

Each grain 60 of gas generating material may have an ignition-enhancing coating (not shown) formed of a pyrotechnic material. The pyrotechnic material of which such coatings are formed does not generate a significant amount of gas for inflating the air bag, but is more readily ignitable than the gas generating material of which the grains 60 are formed. The pyrotechnic material may have any suitable composition known in the art.

The grains 60 of gas generating material are received coaxially within the combustion chamber 54 to define the body 50 of gas generating material, as shown in FIG. 2. A circular spacer 80 and coil spring 82 (shown schematically) also are contained in the housing 12, and are located at opposite ends of the combustion chamber 54.

The spacer 80 is seated closely against the end wall 16 of the housing 12, and spaces the body 50 of gas generating material axially from the end wall 16. The spacer 80 is preferably constructed in accordance with the invention set forth in copending U.S. patent application Ser. No. 08/358,788, filed Dec. 16, 1994, entitled AIR BAG INFLATOR AND METHOD OF ASSEMBLY, and assigned to TRW Vehicle Safety Systems Inc. As described in that copending application, an annular elastomeric seal 84 is stretched circumferentially and radially over the spacer 80. The spacer 80 and the seal 84 together block gas in the combustion chamber 54 from bypassing the filter assembly 52 by flowing radially outward between the end wall 16 and the filter assembly 52. Although the preferred embodiment of the present invention includes the spacer 80 and the seal 84, the closed end of the housing 50 could be sealed by an alternative structure, such as the structure disclosed in copending U.S. patent application Ser. No. 08/436,588, filed May 8, 1995, also entitled AIR BAG INFLATOR AND METHOD OF ASSEMBLY, and also assigned to TRW Vehicle Safety Systems Inc.

A compartment 85 at the center of the spacer 80 contains an optional body 86 of auto-ignition material. The body 86 of auto-ignition material is held in the compartment 85 by a sheet 88 of metal foil or the like which is adhered to an inner surface 90 of the spacer 80. The auto-ignition material ignites and emits combustion products automatically when its temperature reaches a predetermined elevated level, and may have any suitable composition known in the art. The combustion products emitted from the body 86 of auto-ignition material rupture the sealing sheet 88 and emerge from the spacer 80 through an opening 92 adjacent to the body 50 of gas generating material. Those combustion products thus move against the adjacent grain 60 of gas generating material in the combustion chamber 54 to ignite the body 50 automatically when ambient conditions cause the temperature of the inflator 10 to reach the predetermined elevated level. A similar body of auto-ignition material could be contained in a compartment (not shown) in the end cap 28, or elsewhere in the inflator, as known in the art.

The coil spring 82 at the opposite end of the combustion chamber 54 is compressed axially between the end cap 28 and the first grain 60 of gas generating material adjacent to the end cap 28. The coil spring 82 presses the body 50 of gas generating material axially against the spacer 80, and holds the grains 60 of gas generating material together firmly enough to prevent them from rattling within the housing 12.

As shown in FIG. 2, the filter assembly 52 extends axially within the housing 12 from the seal 34 at the end cap 28 to the seal 84 at the spacer 80. The filter assembly 52 includes a filter wall 90 and a layer 92 of filter material. The filter wall 90 has a tubular cylindrical shape, and surrounds the body 50 of gas generating material. The layer 92 of filter material also has a tubular cylindrical shape, and surrounds the filter wall 90.

Figures 5, 6:
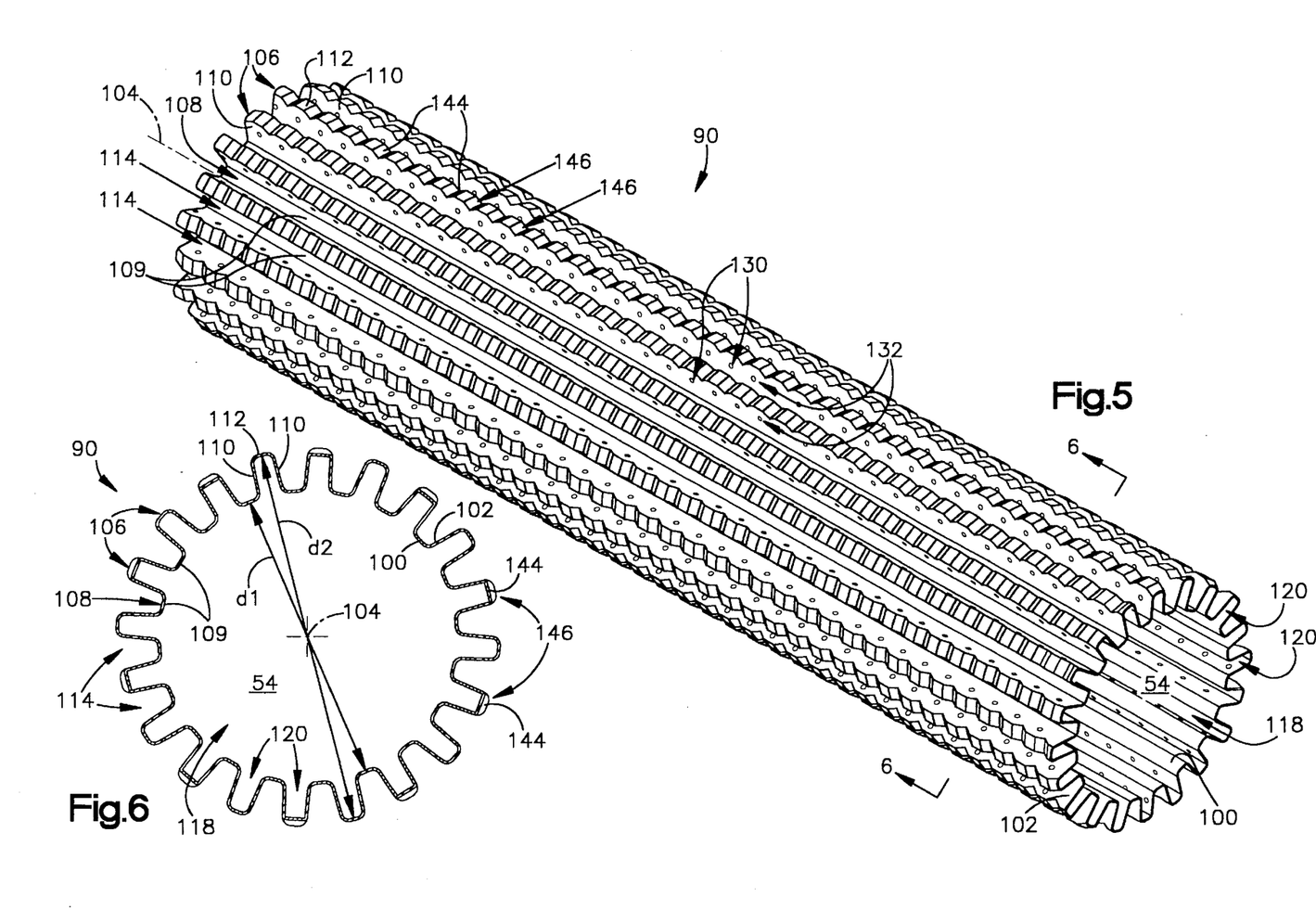
FIG. 5 is a perspective view of another part shown in FIG. 2.
FIG. 6 is a view taken on line 6—6 of FIG. 5.

As shown in FIGS. 5 and 6, the filter wall 90 has oppositely facing inner and outer surfaces 100 and 102 centered on a longitudinal axis 104. A plurality of elongated corrugations 106 extend along the filter wall 90 in directions parallel to the axis 104, and are equally spaced from each other circumferentially about the axis 104. The filter wall 90 also has a cylindrical wall portion 108. The cylindrical wall portion 108 consists of elongated, parallel arcuate segments 109 of the filter wall 90 which are separated from each other by the corrugations 106.

The corrugations 106 have generally rectangular cross-sectional configurations projecting radially outward from the cylindrical wall portion 108. Each corrugation 106 thus has a pair of generally parallel opposite side portions 110 and an outer end portion 112. The side portions 110 of the corrugations 106 extend axially along the entire length of the filter wall 90, and extend equal distances radially outward from the cylindrical wall portion 108. A plurality of equally sized, axially elongated channels 114 are defined at the outside of the filter wall 90 between the opposed side portions 110 of adjacent pairs of the corrugations 106.

The outer end portions 112 of the corrugations 106 also extend axially along the entire length of the filter wall 90, and have concentric arcuate contours extending circumferentially between corresponding pairs of the side portions 110. As a result of its corrugated configuration, the filter wall 90 has a first inner diameter d1 (FIG. 6) and a second, greater inner diameter d2. The first inner diameter d1 is defined by the segments 109 of the cylindrical wall portion 108. The second inner diameter d2 is defined by the outer end portions 112 of the corrugations 106.

As described briefly above with reference to FIG. 2, the filter assembly 52 defines the combustion chamber 54, with the filter wall 90 surrounding the cylindrical body 50 of gas generating material. The first inner diameter d1 of the filter wall 90 is equal to, or just slightly greater than, the outer diameter of the body 50. Accordingly, the cylindrical wall portion 108 of the filter wall 90 defines a cylindrical central portion 118 of the combustion chamber 54 in which the body 50 is contained. As best shown in enlarged detail in FIG. 7, each corrugation 106 defines a corresponding plenum 120. The plenums 120 are compartments of the combustion chamber 54 which extend radially outward from the central portion 118. The plenums 120 have equal volumes defined by the axially extending lengths, the circumferentially extending widths, and the radially extending heights of the corrugations 106.

The filter wall 90 further has an array of fluid flow openings 130. The openings 130 extend through the filter wall 90 between the inner and outer side surfaces 100 and 102, and direct gas to flow outward from the combustion chamber 54 toward the surrounding layer 92 of filter material. As shown in FIG. 5, the array of openings 130 comprises a plurality of rows 132 of openings 130 extending along the side portions 110 of the corrugations 106. The openings 130 have circular shapes of equal flow area, and are equally spaced from each other in the rows 132. Each row 132 of openings 130 extends along the entire length of the corresponding side portion 110, and each side portion 110 has such a row 132 of openings 130. The array of openings 130 thus extends along the entire length, and around the entire circumference, of the filter wall 90.

Figure 7:
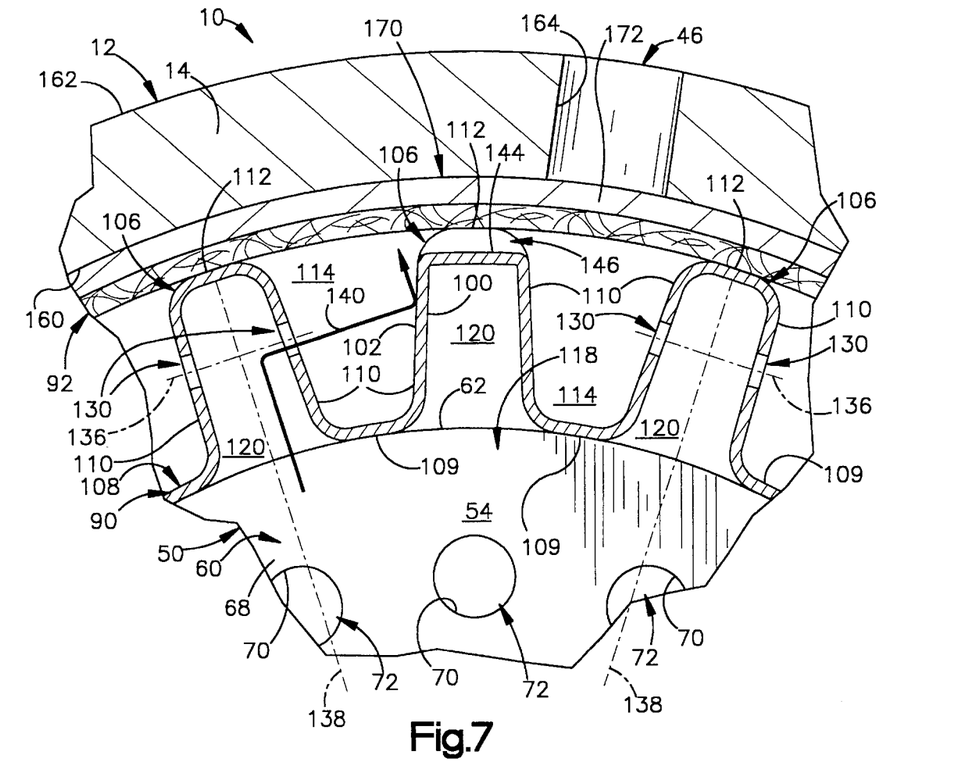
FIG. 7 is a view taken on line 7—7 of FIG. 2.

As best shown in FIG. 7, the openings 130 have central axes 136. Each axis 136 is substantially perpendicular to a corresponding radial line 138 which bisects the corresponding corrugation 106. As a result, gas flowing radially outward through a plenum 120 is directed to turn at an angle substantially equal to 90° before exiting the plenum 120 through the respective openings 130. This is indicated schematically by the arrow 140 shown in FIG. 7. Additionally, the rows 132 of openings 130 are staggered relative to each other such that the rows 132 on each corrugation 106 are offset axially from the rows 132 on each adjacent corrugation 106. As a result of the staggered relationship of the rows 132 of openings 130, each opening 130 faces circumferentially across an adjacent channel 114 at a location that is spaced axially from the openings 130 at the opposite side of the channel 114. Each opening 130 thus faces directly toward the outer surface 102 at an oppositely facing side portion 110 of an adjacent corrugation 106, rather than facing directly toward an opening 130 in the adjacent corrugation 106. Accordingly, gas emerging from an opening 130 is directed to flow across a channel 114 and into contact with an oppositely facing portion of the outer surface 102, as further indicated by the arrow 140 shown in FIG. 7. The gas is then deflected radially outward toward the surrounding layer 92 of filter material upon flowing against the outer surface 102.

In accordance with another feature of the present invention, the outer end portions 112 of the corrugations 106 are indented at a plurality of axially spaced locations. Specifically, each outer end portion 112 has a plurality of indentations 144 which are axially spaced from each other. Each indentation 144 extends fully across the width of the respective outer end portion 112, and defines a respective channel 146 extending circumferentially across the respective corrugation 106. The circumferentially extending channels 146 provide fluid communication between adjacent pairs of the axially extending channels 114. Moreover, the indentations 144 on each corrugation 106 are axially offset from the indentations 144 on each adjacent corrugation 106. The circumferentially extending channels 146, like the openings 130, are thus arranged in axially staggered rows.

The layer 92 of filter material may be formed of any suitable filter material known in the art. Such filter materials include wire mesh screen, steel wool, and ceramic/glass wool. A ceramic material is preferred. The layer 92 of filter material is preferably wrapped around the filter wall 90 in overlying contact with the outer end portions 112 of the corrugations 106, as best shown in FIG. 7. The layer 92 of filter material extends over the channels 114 and 146 to define the radially outer boundaries of the channels 114 and 146. Although a single layer 92 of filter material is shown in the drawings, additional layers of the same or differing filter materials could be used.

As further shown in FIG. 7, the tubular wall 14 of the housing 12 has a cylindrical inner side surface 160, a cylindrical outer side surface 162, and a plurality of cylindrical inner edge surfaces 164 which define the outlet openings 46. A sheet 170 of rupturable pressure controlling material, which is preferably formed of aluminum, is adhered to the inner side surface 160 of the tubular housing wall 14 and extends circumferentially around the tubular housing wall 14 in continuous contact with the inner side surface 160. The sheet 170 has a plurality of individual circular portions 172, each of which extends across the inner end of a respective one of the outlet openings 46.

When the inflator 10 is installed in a vehicle as described above, the initiator 36 is included in an electrical circuit 180. As shown schematically in FIG. 8, the electrical circuit 180 further includes a power source 182, which is preferably the vehicle battery and/or a capacitor, and a normally open switch 184. The switch 184 is preferably part of a sensor 186 which senses a vehicle condition indicative of a collision. The collision-indicating condition may comprise, for example, vehicle deceleration that is caused by a collision. If the collision-indicating condition is above a predetermined threshold, it indicates the occurrence of a collision for which inflation of the air bag is desired to protect an occupant of the vehicle. The sensor 186 closes the switch 184 upon sensing such a collision-indicating condition.

When the switch 184 in the circuit 180 is closed, electric current is directed through the initiator 36 between the lead wires 40 (FIG. 2). The pyrotechnic material in the initiator 36 is then ignited and, as described above, spews combustion products into the housing 12. The combustion products emerging from the initiator 36 move against and ignite the first grain 60 of gas generating material adjacent to the end cap 28.

When the first grain 60 of gas generating material is ignited, it rapidly generates gas for inflating the inflatable vehicle occupant restraint. It also produces and emits additional combustion products, including heat and hot particles. Some of those combustion products move into contact with a second grain 60 of gas generating material. The second grain 60 of gas generating material is then ignited and, in turn, emits additional combustion products. This process continues along the length of the elongated body 50 of gas generating material as all of the grains 60 are ignited successively. The ignitable surface areas provided by the cylindrical inner surfaces 70, and the fluid communication provided by the passages 72, promote rapid ignition of the grains 60 in this manner. The elongated body 50 of gas generating material is thus ignited quickly along its entire length so that gas for inflating the air bag is generated quickly throughout the combustion chamber 54 along the entire length of the elongated body 50.

The combustion chamber 54 is fully closed and sealed at its axially opposite ends by the end cap 28, the spacer 80, and the elastomeric seals 34 and 84. Therefore, the gas generated upon combustion of the body 50 of gas generating material is constrained to flow outward from the combustion chamber 54 only through the filter assembly 52. Since the openings 130 are the only passages through the filter wall 90, the gas is further constrained to flow outward from the combustion chamber 54 along flow paths like the flow path indicated by the arrow 140 shown in FIG. 7.

When the gas changes directions inside the plenums 120, as described above, the particulate combustion products carried by the gas tend to move inertially relative to the gas. This causes some of the particulate combustion products to move radially outward through the plenums 120 toward and against the inner surface 100 of the filter wall 90 at the end portions 112 of the corrugations 106. Those particulate combustion products become plated out against the inner surface 100 at the end portions 112 of the corrugations 106. Other particulate combustion products become plated out against the inner surface 100 at the side portions 110 of the corrugations 106 as a result of turbulence in the flows of gas moving through the plenums 120. A substantial amount of the particulate combustion products is retained in the combustion chamber 54 in this manner as a result of the corrugated configuration of the filter wall 90.

Additional particulate combustion products become plated out against the outer surface 102 of the filter wall 90 in a similar manner when the gas moves through the channels 114 and 146 outside of the corrugations 106 after exiting the plenums 120. The gas is also cooled as it moves against the filter wall 90 both inside and outside of the corrugations 106. The corrugated configuration of the filter wall 90 provides increased surface area for plating out of combustion products and for absorption of heat from the gas in this manner. In accordance with this feature of the present invention, each of the opposite surfaces 100 and 102 of the filter wall 90 has a total surface area which is substantially greater than the total fluid flow area provided by the array of openings 130. Preferably, the openings 130 in the filter wall 90 together have a total fluid flow area within the range of approximately 5% to approximately 35% of the total surface area of either of the surfaces 100 and 102. The total fluid flow area of the openings 130 is most preferably within the range of approximately 10% to approximately 20% of the total surface area of either of the surfaces 100 and 102.

In accordance with an additional feature of the present invention, a substantial amount of the gas is diffused fully throughout the channels 114 and 146 before entering the layer 92 of filter material. The diffused gas then enters and flows evenly throughout the layer 92 of filter material, rather than being concentrated at locations adjacent to the openings 130 in the filter wall 90. The gas is further cooled and filtered as it continues to move radially outward through the layer 92 toward the tubular wall 14 of the housing 12.

As the gas approaches the tubular wall 14, the sheet 170 of rupturable pressure controlling material initially contains the gas within the housing 12. When the pressure of the gas acting radially outward against the sheet 170 reaches a predetermined elevated level, it ruptures the circular portions 172 of the sheet 170 which extend across the inner ends of the outlet openings 46. The gas then emerges from the housing 12 through the outlet openings 46.

Figure 9:
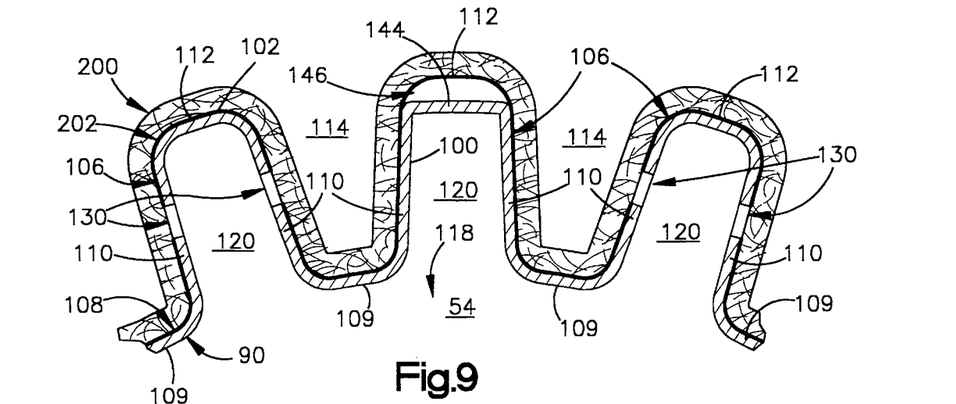
FIG. 9 is a view similar to FIG. 7 showing parts of an inflator comprising a second embodiment of the present invention.

A second embodiment of the present invention is shown partially in FIG. 9. In the second embodiment, the inflator 10 includes an alternative layer 200 of filter material in place of the layer 92 of filter material described above. Like the layer 92, the layer 200 may be formed of any suitable filter material known in the art, and is preferred to comprise a ceramic material. However, unlike the layer 92, the layer 200 does not extend circumferentially over the axially extending channels 114 between the corrugations 106 in the filter wall 90. Instead, the layer 200 overlies the filter wall 90 within the channels 114 so as to follow the undulating contour of the filter wall 90 across and between the corrugations 106. An adhesive is preferably used to establish a bond 202 between the layer 200 of filter material and the filter wall 90 so as to secure the layer 200 in place.

In each of the embodiments of the present invention described above, the filter wall 90 preferably comprises a thin piece of sheet metal which is either steel or aluminum. The openings 130 are preferably formed by perforating the sheet metal. The corrugations 106 are preferably formed by moving the perforated sheet metal between corrugation roll dies. The filter wall 90 is preferably provided with its cylindrical shape by rolling a cut section of the perforated, corrugated sheet metal into a cylindrical shape, and by welding the opposite ends of the cut section together at a longitudinally extending seam (not shown). Such an assembly process can be performed with any suitable apparatus known in the art.

From the above description of the invention, those skilled in the art will perceive improvements, changes and modifications. Such improvements, changes and modifications within the skill of the art are intended to be covered by the appended claims.

Having described the invention, the following is claimed:

1. Apparatus for inflating an inflatable vehicle occupant restraint, said apparatus comprising:

a source of inflation fluid for inflating the restraint;

a tubular wall having a central axis, oppositely facing inner and outer surfaces extending around said axis, and an array of fluid flow openings extending through said tubular wall between said surfaces, said array of openings having a total fluid flow area, each of said surfaces having a total surface area substantially greater than said total fluid flow area; and means for initiating a flow of said inflation fluid from said source upon the occurrence of a vehicle collision, said flow of inflation fluid following a flow path extending through said openings in said tubular wall;

said tubular wall further having a plurality of elongated corrugations, each of said corrugations having a pair of radially extending side portions, said array of openings comprising rows of said openings extending along said side portions of said corrugations.

2. Apparatus as defined in claim 1 wherein said total fluid flow area is within the range of approximately 5% to approximately 35% of either of said total surface areas.

3. Apparatus as defined in claim 1 wherein said total fluid flow area is within the range of approximately 10% to approximately 20% of either of said total surface areas.

4. Apparatus as defined in claim 1 wherein said array of openings extends entirely around said axis.

5. Apparatus as defined in claim 1 wherein said corrugations and said rows of said openings are elongated in directions extending along said axis.

6. Apparatus as defined in claim 5 wherein said rows of said openings extend axially along the entire lengths of said corrugations.

7. Apparatus as defined in claim 1 wherein adjacent pairs of said corrugations have respective adjacent rows of said openings, said openings in one of said adjacent rows being offset longitudinally from said openings in another of said adjacent rows.

8. Apparatus as defined in claim 1 wherein said corrugations have radially outer end portions extending between said side portions, said radially outer end portions having radial indentations comprising means for defining fluid flow channels extending across said corrugations between said side portions.

9. Apparatus as defined in claim 8 wherein adjacent pairs of said corrugations have respective adjacent rows of said indentations, said indentations in one of said adjacent rows being offset longitudinally from said indentations in another of said adjacent rows.

10. Apparatus as defined in claim 1 wherein said inflation fluid comprises gas which is generated upon combustion of an ignitable gas generating material, said tubular wall defining a combustion chamber containing said gas generating material.

11. Apparatus as defined in claim 10 wherein each of said corrugations defines a corresponding plenum portion of said combustion chamber.

12. Apparatus as defined in claim 1 wherein said tubular wall is formed of sheet metal, said openings comprising circular perforations through said sheet metal.

13. Apparatus as defined in claim 1 wherein said tubular wall comprises means for blocking said fluid from flowing through said tubular wall other than through said rows of openings.

14. Apparatus as defined in claim 1 further comprising means for defining a tubular layer of filter material, said tubular layer of filter material surrounding said tubular wall in overlying contact with said corrugations.

15. Apparatus for inflating an inflatable vehicle occupant restraint, said apparatus comprising:

a source of inflation fluid comprising an ignitable gas generating material which, when ignited, generates gas for inflating the restraint;

a tubular wall comprising means for defining a combustion chamber containing said gas generating material, said tubular wall having a central axis and means for defining gas flow openings; and means for igniting said gas generating material upon the occurrence of a vehicle collision;

said tubular wall further having a plurality of radially projecting corrugations, each of said corrugations defining a corresponding plenum portion of said combustion chamber.

16. Apparatus as defined in claim 15 wherein said tubular wall has a cylindrical portion comprising concentric sections of said tubular wall which are spaced from each other by said corrugations, said cylindrical portion of said tubular wall defining a cylindrical central portion of said combustion chamber, each of said plenum portions of said combustion chamber extending radially outward from said central portion of said combustion chamber.

17. Apparatus as defined in claim 16 wherein said gas flow openings extend through said corrugations, said cylindrical portion of said tubular wall blocking said gas from flowing radially outward from said central portion of said combustion chamber between said plenum portions of said combustion chamber.

18. Apparatus as defined in claim 17 wherein said cylindrical portion of said tubular wall has an inner diameter, said source of inflation fluid comprising a cylindrical body of said gas generating material which is located in said central portion of said combustion chamber, said cylindrical body having an outer diameter substantially equal to said inner diameter.

19. Apparatus as defined in claim 15 further comprising means for defining a tubular layer of filter material, said tubular layer of filter material surrounding said tubular wall in overlying contact with said corrugations.

20. Apparatus as defined in claim 19 wherein said tubular wall and said tubular layer of filter material together define a plurality of gas flow channels, each of said gas flow channels extending radially from said tubular wall to said tubular layer of filter material.

21. Apparatus as defined in claim 20 wherein said gas flow channels include first and second channels, said first channels being located between adjacent pairs of said corrugations, said second channels extending across said corrugations between adjacent pairs of said first channels.

22. Apparatus as defined in claim 15 further comprising means for defining a tubular layer of filter material, said tubular wall having an undulating contour extending across and between said corrugations, said tubular layer of filter material following said undulating contour across and between said corrugations in overlying contact with said tubular wall.

23. Apparatus as defined in claim 22 wherein said tubular layer of filter material is adhered to said tubular wall.

24. Apparatus as defined in claim 15 wherein said corrugations are elongated in directions extending along said axis.

25. Apparatus as defined in claim 15 wherein said tubular wall is formed of sheet metal, said openings comprising circular perforations through said sheet metal.

\* \* \* \* \*